Nov. 30, 1943.   P. A. DOWNEY   2,335,398
WHEEL DRIVE FOR AIRPLANES
Filed Jan. 29, 1942   2 Sheets-Sheet 1

Inventor

PAUL A. DOWNEY,

By Clarence A. O'Brien
and Harvey B. Jacobson
Attorney

Nov. 30, 1943.   P. A. DOWNEY   2,335,398
WHEEL DRIVE FOR AIRPLANES
Filed Jan. 29, 1942   2 Sheets-Sheet 2
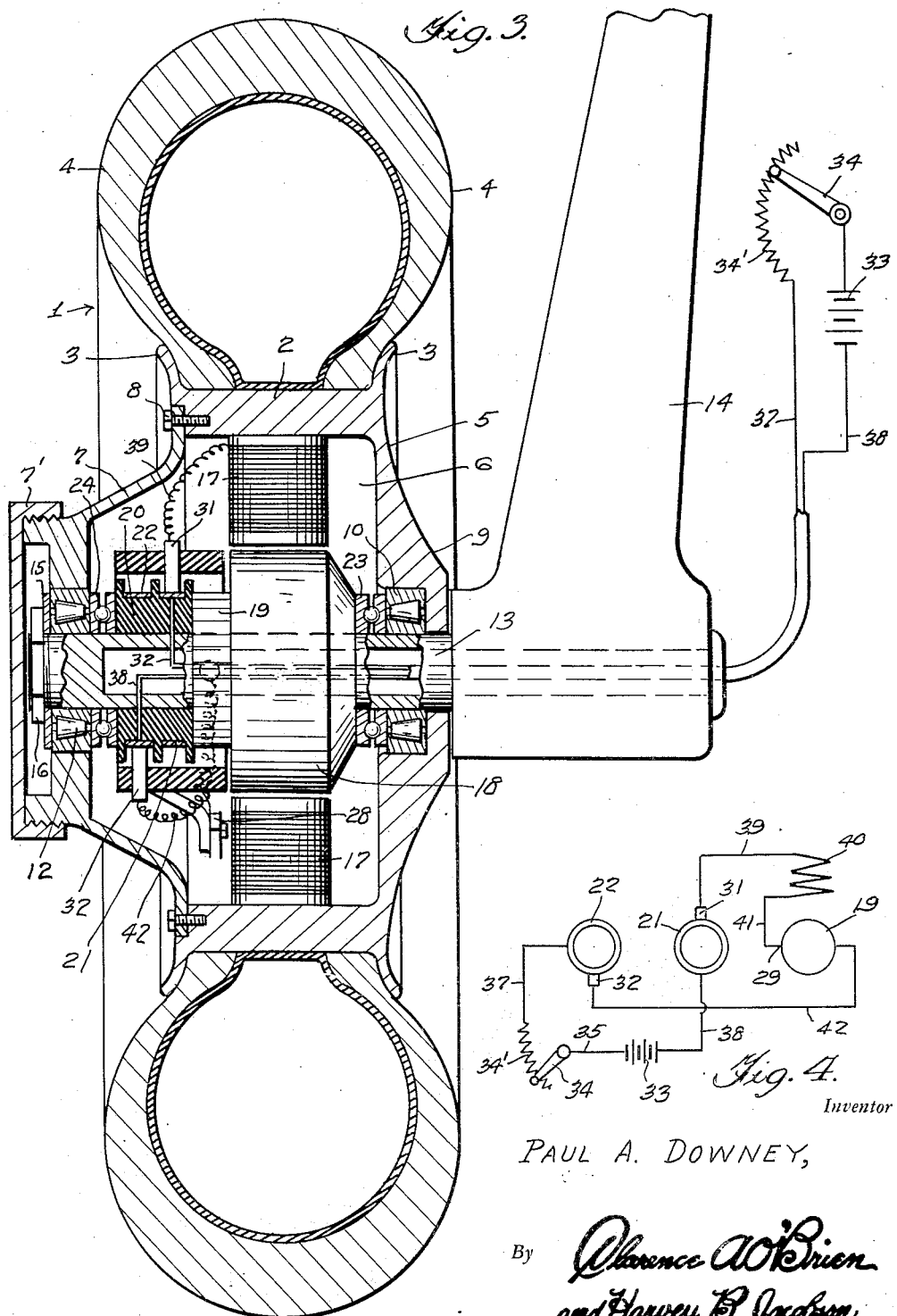
Inventor
PAUL A. DOWNEY,
By Clarence A. O'Brien
and Harvey B. Jacobson
Attorneys Patented Nov. 30, 1943

2,335,398

UNITED STATES PATENT OFFICE 2,335,398

WHEEL DRIVE FOR AIRPLANES

Paul A. Downey, San Diego, Calif.

Application January 29, 1942, Serial No. 428,791

2 Claims. (Cl. 172—287)

My invention relates to improvements in wheel drives for the landing gear wheels of airplanes, the primary object in view being to provide a simply constructed, built-in, compact motor drive for variably rotating such wheels prior to landing at a speed corresponding to the speed of travel of the plane at the instant of landing, so as to reduce shock and jar incident to landing operations and obviate wear on the wheel tires.

To the accomplishment of the above, and subordinate objects presently appearing, a preferred embodiment of my invention has been illustrated in the accompanying drawings, set forth in detail in the succeeding description, and defined in the claims appended hereto.

Figure 1:
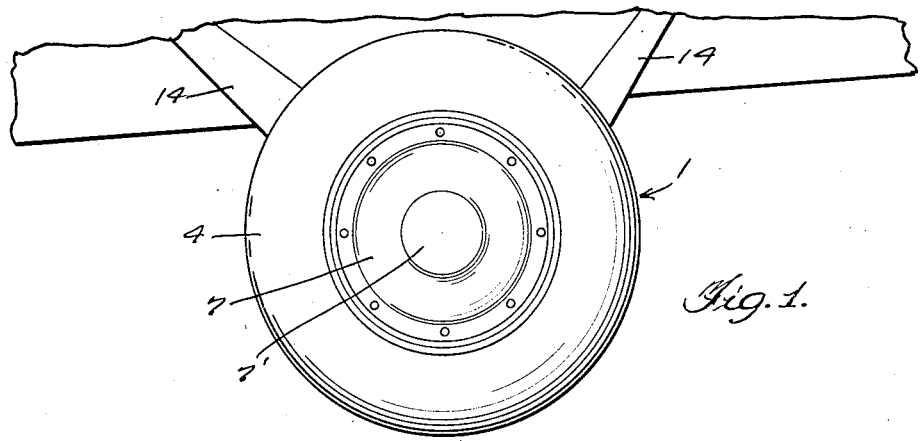
Figure 2:
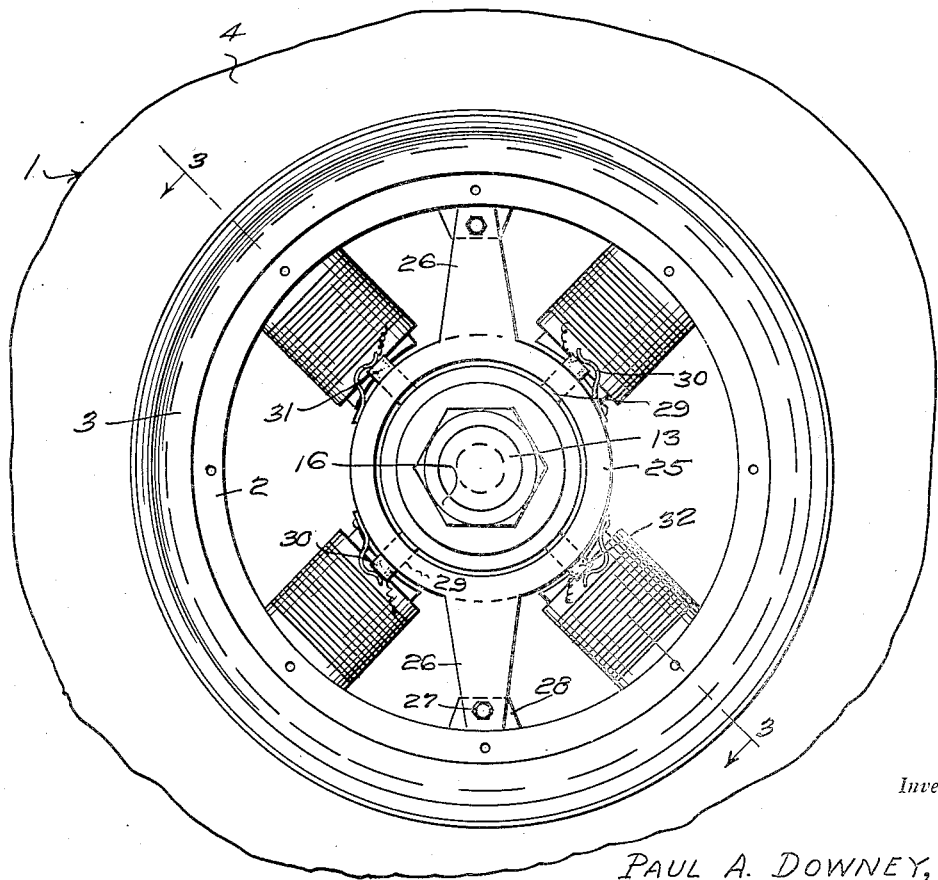

In said drawings:

Figure 1 is a fragmentary view in side elevation of a portion of an airplane landing gear including a wheel embodying my improvements, Figure 2 is a view in side elevation of said wheel with the front cover plate removed, Figure 3 is a view in vertical transverse section taken on the line 3—3 of Figure 2 and drawn to an enlarged scale, and Figure 4 is a diagrammatic view of the circuit.

Reference being had to the drawings by numerals, in accordance with my invention a landing gear wheel 1 of the disc type is provided including a rim 2 equipped with edge retaining flanges 3 for a pneumatic tire 4, a back plate forming together with said rim a circular, open front chamber 6 in the wheel, and a cap-type closure plate 7 for said chamber adapted to be set in to the front edge of the rim 2 and to be secured to said edge by bolts 8.

The back plate 5 includes a hub portion 9 having set into the same from the inner side thereof an anti-friction bearing assembly 10 preferably of the tapered roller bearing type. The front plate 7 has suitably mounted therein, as by the spider 11, an anti-friction bearing assembly 12. Both bearing assemblies 10 and 12, as will be understood, are axially aligned in the axis of the wheel 1.

The described wheel 1 is rotatably mounted on a tubular spindle 13 fixed in and extending from one leg 14 of the landing gear, said spindle being journaled in the bearing assemblies 10, 12 and having a closed externally threaded outer end. Washer 15 and nut 16 on said outer end of the spindle 13 secure the latter in the bearing assemblies 10 and 12. A detachable cap 7' on the closure plate 7, preferably threaded thereon, provides for access to the interior of said plate.

Within the chamber 6 is a plurality of electro-magnetic field coil units 17 secured in any suitable manner to the rim 2 to extend radially therefrom in equidistantly spaced relation around the chamber, there being preferably four of such units as shown. The said field units 17, as will be clear, are designed to be revolved with the wheel around the usual armature 18 fixed in any suitable manner on the spindle 13 and provided on the outer side thereof with the usual commutator ring 19 surrounding the spindle 13 concentrically thereof, the commutator ring being fixed as will be understood.

Alongside the commutator ring 19 and suitably fixed on the spindle 13 is a sleeve 20 of insulation concentric to the spindle and having embedded in the periphery thereof a pair of laterally spaced inner and outer collector rings 21, 22 of any suitable conductive material.

A pair of end thrust ball bearings 23, 24 are interposed between the armature 19 and bearing assembly 13 and between the sleeve 20 and the bearing assembly 12.

Surrounding the commutator ring 19, and the sleeve 20 and collector rings 21, 22, in concentric spaced relation thereto, is an annular brush carrier 25 of insulation material mounted on the rim 2 of the wheel 1 to be revolved therewith. Preferably the mounting for the brush carrier 25 comprises a pair of diametrically opposite arms 26 extending therefrom and bolted, as at 27, to internal lugs 28 on said rim 2.

A pair of plug-like brushes 29 are suitably mounted in the brush carrier 25 in diametrically opposite relation to slidably extend radially through said carrier and bear against the commutator ring 19, said brushes being spring pressed inwardly by leaf springs 30 against said ring. A similar, diametrically arranged pair of spring pressed brushes 31, 32 are provided in the brush carrier 25 to bear against the inner and outer collector rings 21, 22, respectively, in 90 degree angular relation to the brushes 29.

Referring now more particularly to Figure 4, preferably the described field is designed to be energized from a source of power in the airplane such as a battery 33 and under control of a rheostat. The control arm 34 of the rheostat is connected by a lead 35 to one side of the battery 33, the coil 34' of the rheostat being connected by a lead 37 to the inner collector ring 21, said lead 37 being extended into the spindle 13 and out of the same and the sleeve 20 to said ring. The other side of the battery 33 is similarly connected by a lead 38 to the outer collector ring 22. The coil units 17 of the field are wound in series. The brush 31 of the inner collector ring 21 is connected by a lead 39 to one side of the field, designated 40, and which has its other side wired, as at 41, to one of the brushes of the commutator ring 19. The brush 32 of the outer collector ring 22 is wired by a lead 42 to the other brush 29 of the commutator ring 19.

As will be understood, when the described field is energized it is caused to revolve around the armature 18 and to thereby revolve the wheel, and the speed of revolution may be selectively controlled through the rheostat 34, 34'.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the subjoined claims.

What I claim is:

1. In a landing gear for airplanes, the combination with a hollow fixed wheel spindle, of a wheel rotatably mounted on said spindle and including a rim and a back plate forming a circular open front chamber in said wheel, an armature fast on said spindle within said chamber, a plurality of electromagnetic field units extending from the inner wall of said rim radially of said armature and connected in series, a front cover plate detachably secured to said wheel for closing said chamber, and means to energize said field units comprising a fixed commutator ring surrounding the spindle, a pair of fixed collector rings surrounding said spindle and insulated therefrom and from each other, a pair of brushes for said pair of collector rings, respectively, a pair of brushes for said commutator ring, means to mount said brushes on said ring for rotation thereby around said rings, and a source of electrical energy connected on one side to one of the first-mentioned pair of rings and on its other side to the other ring of the first-mentioned pair, the connections extending through said spindle.

2. In a landing gear for airplanes, the combination with a hollow fixed wheel spindle, of a wheel rotatably mounted on said spindle and including a rim and a back plate forming a circular open front chamber in said wheel, an armature fast on said spindle within said chamber, a plurality of electro-magnetic field units extending from the inner wall of said rim radially of said armature and connected in series, a front cover plate detachably secured to said wheel for closing said chamber, and means to energize said field units comprising a fixed commutator ring surrounding the spindle, a pair of fixed collector rings surrounding said spindle and insulated therefrom and from each other, a pair of brushes for said pair of collector rings, respectively, a pair of brushes for said commutator ring, means to mount said brushes on said ring for rotation thereby around said rings, and a source of electrical energy connected on one side to one of the first-mentioned pair of rings and on its other side to the other ring of the first-mentioned pair, the connections extending through said spindle, one of the brushes of the first-mentioned pair being wired to one side of said field, the other side of the field being wired to one of the brushes of the second-mentioned pair, and a lead connecting the other brush of the first-mentioned pair with the other brush of the second-mentioned pair.

PAUL A. DOWNEY.